US006837915B2

(12) United States Patent
Dunmead et al.

(10) Patent No.: US 6,837,915 B2
(45) Date of Patent: Jan. 4, 2005

(54) HIGH DENSITY, METAL-BASED MATERIALS HAVING LOW COEFFICIENTS OF FRICTION AND WEAR RATES

(75) Inventors: Stephen D. Dunmead, Solon, OH (US); James M. Marder, Shaker Heights, OH (US)

(73) Assignee: SCM Metal Products, Inc., Research Triangle Park, NC (US)

( * ) Notice: Subject to any disclaimer, the term of this patent is extended or adjusted under 35 U.S.C. 154(b) by 0 days.

(21) Appl. No.: 10/247,939

(22) Filed: Sep. 20, 2002

(65) Prior Publication Data

US 2004/0055416 A1 Mar. 25, 2004

(51) Int. Cl.$^7$ .................................................. B22F 3/00
(52) U.S. Cl. ............................ 75/231; 75/243; 75/246; 75/247; 75/249
(58) Field of Search ........................... 75/231, 243, 246, 75/247, 249; 419/11, 13, 41, 48, 49

(56) References Cited

U.S. PATENT DOCUMENTS

| | | | | |
|---|---|---|---|---|
| 2,888,738 A | * | 6/1959 | Taylor | .......................... 75/244 |
| 3,768,972 A | | 10/1973 | Taylor et al. | |
| 4,006,016 A | * | 2/1977 | Zambrow et al. | .............. 419/28 |
| 4,165,243 A | * | 8/1979 | Sarnes et al. | ................. 419/28 |
| 4,253,874 A | * | 3/1981 | Cundill | ........................ 75/246 |
| 4,428,906 A | | 1/1984 | Rozmus et al. | |
| 4,474,732 A | * | 10/1984 | Lynn | ........................... 419/11 |
| 4,495,123 A | | 1/1985 | Hunold et al. | |
| 4,551,395 A | | 11/1985 | Lloyd | |
| 4,634,640 A | | 1/1987 | Hunold et al. | |
| 4,656,002 A | | 4/1987 | Lizenby et al. | |
| 4,661,154 A | * | 4/1987 | Faure | ........................... 75/231 |
| 4,767,456 A | * | 8/1988 | Spitzer | ......................... 75/246 |
| 4,938,810 A | * | 7/1990 | Kiyota et al. | ................ 148/437 |
| 4,964,908 A | * | 10/1990 | Greetham | ..................... 75/241 |
| 5,004,498 A | | 4/1991 | Shimamura et al. | |
| 5,064,589 A | | 11/1991 | Ichikawa et al. | |
| 5,116,589 A | | 5/1992 | Hoenig | |
| 5,151,247 A | * | 9/1992 | Haglund et al. | .............. 419/13 |
| 5,409,552 A | | 4/1995 | McDevitt et al. | |
| 5,427,600 A | * | 6/1995 | Itoh et al. | ...................... 75/232 |
| 5,466,414 A | * | 11/1995 | Pettersson | ..................... 419/11 |
| 5,484,662 A | | 1/1996 | Rao | |
| 5,520,467 A | | 5/1996 | Nojima et al. | |
| 5,545,249 A | * | 8/1996 | Tanaka et al. | ................. 75/246 |
| 5,598,621 A | | 2/1997 | Littecke et al. | |
| 5,676,496 A | | 10/1997 | Littecke et al. | |
| 5,784,681 A | * | 7/1998 | Purnell et al. | ................. 419/11 |
| 5,834,689 A | | 11/1998 | Cook | |
| 5,835,841 A | | 11/1998 | Yamada et al. | |
| 5,937,268 A | | 8/1999 | Ozaki et al. | |
| 5,993,731 A | | 11/1999 | Jech et al. | |
| 6,051,058 A | | 4/2000 | Crisci et al. | |
| 6,074,454 A | | 6/2000 | Abrams et al. | |
| 6,096,671 A | * | 8/2000 | Kawasaki et al. | .......... 501/96.4 |
| 6,110,420 A | | 8/2000 | Moorhead et al. | |
| 6,228,481 B1 | | 5/2001 | Yamada et al. | |
| 6,303,235 B1 | * | 10/2001 | Kawakami et al. | .......... 428/553 |
| 6,319,602 B1 | | 11/2001 | Fauzi et al. | |
| 6,334,914 B2 | * | 1/2002 | Sakai et al. | ................. 148/433 |
| 6,558,144 B1 | * | 5/2003 | Gueydan et al. | .............. 425/78 |

FOREIGN PATENT DOCUMENTS

EP       0 154 992 B1    11/1991

* cited by examiner

*Primary Examiner*—Ngoclan T. Mai
(74) *Attorney, Agent, or Firm*—Kalow & Springut LLP

(57) ABSTRACT

High theoretical density, metal-based materials containing graphite or hexagonal boron nitride have low coefficients of friction and wear rates are useful for bearings, bushings and other articles subject to bearing loads.

22 Claims, No Drawings

HIGH DENSITY, METAL-BASED MATERIALS HAVING LOW COEFFICIENTS OF FRICTION AND WEAR RATES

FIELD OF THE INVENTION

The invention relates generally to high theoretical-density metal-based materials having low coefficients of friction and wear rates and more particularly to high-density metal-based materials containing graphite or hexagonal boron nitride.

BACKGROUND OF THE INVENTION

Journal bearings, bushings and other fabrications subject to loads bearing require a material that has a low coefficient of friction. As there is always relative motion between a bearing and its mating surface, friction is always a concern. Friction results in loss of power, generation of heat and increased surface wear. Therefore, a major consideration is that the material of a bearing, bushing and similar load-bearing items, has a low coefficient of friction.

As friction causes wear, also of concern is that the material be highly resistant to wear. Another major concern is that the material has sufficient strength or hardness for bearing loads that may continuously vary in magnitude.

Bearing alloys used in engine parts generally consist of either an aluminum or copper matrix containing alloying additions of an elemental metal which is not soluble in the matrix and exists therefore as a discrete phase. In aluminum matrix alloys the well-known and used elemental metals are tin, lead and cadmium and many alloys containing these constituents.

In the case of copper based alloys, however, only lead has been generally used. Lead is one of the few low melting point metals, which has the properties necessary to form a good bearing material with copper. The copper-lead alloys have given good service as engine bearing alloys but they have some limitations.

The two most serious problems with copper-lead alloys are:

(1) lead is a toxic substance and the use of lead in the production of alloys involves expensive control procedures; and (2) the lead phase in copper-lead alloys is seriously affected by corrosive attack in hot engine oil. When engine oil is oxidized while hot (during the normal running of an engine) the oil breaks down to form peroxides and organic acids that dissolve the lead phase; this seriously weakens the bearing alloys and causes eventual malfunction and failure.

Currently copper, bronze or brass lead-bearing alloys are cast using special techniques to achieve the fine distribution of lead necessary for machinability and tribological properties.

For certain applications, other metal and metal alloy materials have been used. For example, it is known to use tantalum, among other metals and alloys, with a solid lubricant exposed at its surfaces, for a roller bearing apparatus to be used in a molten metal bath.

Graphite and hexagonal boron nitride are both known to be solid lubricants useful in improving the machinability of metals and alloys, such as brass. Graphite and hexagonal boron nitride also have been used in metal-based, load-bearing articles. For example, the prior art describes a sliding member made by mixing a matrix material of iron-based powder containing chromium with 0.1 to 3.5 weight % hexagonal boron nitride and 0.1 to 3.5 wt. % graphite. The resultant powder mixture is compacted then sintered while in contact with copper or copper alloy such that the copper or copper alloy infiltrates into the iron-based matrix and the hexagonal boron nitride is distributed in the copper phase. The graphite reacts with the chromium to be precipitated as chromium carbide. The porosity of the obtained sintered product was at least 3% (by volume). However, neither graphite nor hexagonal boron nitride is known to be suitable as a full replacement for lead.

Shaped articles consisting of hexagonal boron nitride are known. Some prior art references describe shaped articles of hexagonal boron nitride having a density of at least 95% of its theoretical density consisting of pure hexagonal boron nitride that was hot isostatically pressed. However, the use of hexagonal boron nitride to form a highly densified metal-based material with low coefficients of friction and wear rates is not known.

SUMMARY OF THE INVENTION

The invention provides a shaped, metal-based material comprising a mixture of a metal and from about 0.1 to about 5 weight percent of a solid lubricant selected from the group consisting of hexagonal boron nitride, graphite and mixtures thereof. The metal-based material has an actual density of at least about 99 percent of its theoretical density. The metal-based material is wear-resistant, and may be subject to high bearing loads.

The invention is based on the discovery that a mixture incorporating boron nitride or graphite with a metal can be densified to or near its theoretical density. The maximal structural integrity of the resultant metal-based material yields excellent wear and strength properties. As these properties can be superior to metal-based materials containing lead, the invention enables the production of lead-free metal materials suitable for use in such demanding applications as journal bearings, bushings and other materials subject to bearing high loads.

In one embodiment, the invention includes compacted metal-based material comprising a metal and about 0.1 to about 5 weight percent of hexagonal boron nitride or graphite, or mixtures thereof, and having an actual density of at least about 99 percent of the theoretical density of the metal-based material. As hot isostatically processed metal-based material is readily producible, these metal-based materials are particularly within the invention.

In another embodiment, the invention provides a method for preparing a wear-resistant, shaped, metal-based material, subject to high bearing loads. This method comprises forming a uniform mixture of a metal and about 0.1 to about 5 weight percent of a solid lubricant selected from the group consisting of hexagonal boron nitride, graphite and mixtures thereof; and compacting the mixture to form a compact having an actual density of at least 99 percent of the theoretical density of the compact.

The method of the invention permits the use of powders of the metal and solid lubricant, thereby enabling the direct control of the amount and distribution of the solid lubricant incorporated with the metal through the selection of the powders and the degree of mixing.

In still another embodiment, the present invention provides a wear-resistant, shaped, metal-based product made by methods comprising forming a uniform mixture of a metal and a solid lubricant selected from the group consisting of hexagonal boron nitride, graphite and mixtures thereof; and compacting the mixture to form a compact having an actual density of at least 99 percent of the theoretical density of the compact.

In yet another embodiment, the present invention provides a wear resistant, metal-based, bearing and a wear-resistant, metal-based bushing, each comprising a hot-isostatically pressed, uniform mixture of from about 95 to about 99 weight percent copper or copper alloy and from about 1 to about 5 weight percent hexagonal boron nitride lubricant; with the pressed mixture having an actual density of at least 99 percent of the theoretical density of the mixture.

Accordingly, it is one advantage of the present invention to provide high-density metal-based materials having low coefficients of friction and wear rates. Another advantage of the present invention is to provide high-density metal-based materials containing a solid lubricant of graphite or hexagonal boron nitride. Also, yet another advantage of the invention is to provide high-density metal-based materials having low coefficients of friction and wear rates that are lead-free.

The high-density metal-based materials of the present invention are suitable for use as journal bearings, bushings and other materials subject to bearing high bearing loads.

Other advantages of the present invention include methods for readily preparing high-density metal-based materials containing a solid lubricant of graphite or hexagonal boron nitride. Yet other advantages of the present invention include methods for readily preparing high-density metal-based materials using powders of a metal and a solid lubricant of graphite or hexagonal boron nitride.

For a better understanding of the present invention together with other and further advantages and embodiments, reference is made to the following description taken in conjunction with the examples, the scope of which is set forth in the appended claims.

DETAILED DESCRIPTION OF THE INVENTION

The invention will now be described in connection with preferred embodiments. These embodiments are presented to aid in an understanding of the present invention and are not intended to, and should not be construed to, limit the invention in any way. All alternatives, modifications and equivalents that may become obvious to those of ordinary skill on reading the disclosure are included within the spirit and scope of the present invention.

The metal-based materials of the invention comprise a metal and a solid lubricant selected from graphite, hexagonal nitride boron, and mixtures thereof.

Although embodiments of the invention include both graphite and hexagonal boron nitride as the solid lubricant, the metal-based materials containing hexagonal boron nitride of the invention are exemplified and explained in more detail than the metal-based materials containing graphite. However, these descriptions are similarly applicable to metal-based materials containing graphite.

The metal is the base material, and is the major constituent. It may be selected from iron, carbon steel, stainless steel, chromium, aluminum, copper, brass, bronze, and other copper based alloys.

The invention permits the use of powders to form the metal-based materials. This allows for direct control of the amount of each element and its distribution in the metal-based material through individual selection of the powders and management of their mixing. Thus, it is preferred that metal powders be used to carry-out the invention.

The size of the metal powder particles is desirably no greater than about 100 mesh maximum, more desirably no greater than about 150 mesh, and most desirably no greater than about 200 mesh.

The amount of metal used is the remainder after the amount of solid lubricant and any additives employed in the material.

Stainless steel pre-alloy powders are commercially available.

Pure copper, and atomized pure copper may be used in embodiments of the invention. Also, bronze or brass, or another copper alloy may be used in embodiments of the invention.

"Alloys" within the scope of the present invention means the intentional combination of a metal with another element.

Copper alloys may be provided as pre-alloyed powders or may be alloyed during the hot-compaction process from a powder mixture made by mixing copper powder such as OMG grade 150A (obtained from OMG Americas, Research Triangle Park, N.C., U.S.A.) with zinc powder or tin powder, or a powder of one or more other alloy metals such as cobalt, iron or the like. In a case of using powder mixture, the powders should be sufficiently mixed so that no segregation takes place. Accordingly, the use of alloy powder that can facilitate the mixing of the powders is preferred.

Regarding pre-alloy powders, brass, bronze and other copper alloy powders are commercially available. The usable powders include any copper-based alloy; particularly brass, bronze, and beryllium-copper alloys.

A copper alloy should be selected appropriately according to the hardness of a mated member, but also for its low coefficient of friction. Copper alloys containing about 10 to about 30 weight % tin and the balance Cu, or preferably containing about 10 to about 15 weight % tin and the balance Cu, are particularly useful because they impart strength and hardness.

Other useful copper alloys include alloys containing beryllium or aluminum which improve strength and hardness. A preferred copper alloy is one containing about 0.5 to about 2 weight % beryllium.

Any commercially available graphite powder can be used. Further, for the purpose of obtaining a shaped article having high density, high strength, and a graphite powder having a purity of at least about 99.0 weight % and an average particle size of not more than about 20 microns is preferred. It is preferred more that the graphite have a purity of at least about 99.5 weight % and an average particle size of not less than about 10 microns.

The hexagonal boron nitride used in the invention is not restricted in particular, and any commercially available hexagonal boron nitride powder can be used. However, it is preferred that commercially available low oxygen content boron nitride powder, preferably having less than about 0.5 weight % oxygen, is used as the starting material to avoid boron oxide formation. Further, for the purpose of obtaining a shaped article having high density, and high strength, a hexagonal boron nitride powder having a purity of at least about 99.5 weight % and an average particle size of not more than about 8–12 microns is preferred. It is preferred more that the hexagonal boron nitride have a purity of at least about 99.9 weight % and an average particle size of not more than about 9–12 microns. Both AC6004 and HCPL grades of hexagonal boron nitride powders (obtained from Advanced Ceramics Corporation, Lakewood, Ohio, U.S.A.) have been found to be useful in the practice of the invention.

Regarding the amount of solid lubricant to be employed, it is preferred that graphite, hexagonal boron nitride, or a mixture of the two, be present in an amount sufficient to reduce by at least about 20 percent the coefficient of friction of the mixture below that of the mixture without the solid lubricant. In the case of less than about 0.1 weight % of solid lubricant, sufficient lubricating operation is not obtained. Also, it is preferred that the amount of the solid lubricant present reduces by less than about 10 percent the yield strength of the mixture without the solid lubricant. More than about 10 weight % solid lubricant may significantly reduce the strength. For practical purposes, there is generally no need to use more than about 5 weight % of solid lubricant to achieve the improved properties of the invention. Thus, the amount of solid lubricant preferably is from about 0.5 to about 5 weight %; more preferred is an amount from about 2 to about 5 weight percent.

Although the metal-based materials of embodiments of the invention are all based on a metal and a solid lubricant, other additions can be made which are either to ease production or to modify the metal-based material's properties.

The metal powder(s), graphite, or hexagonal boron nitride powder, and any additives are blended together to form a mixture where the powders are evenly distributed. Any powder blending technique that renders a uniform mixing can be used. Known devices such as a v-blender or v-cone may be used to mix the ingredients. The mixing can be carried out at room temperature under atmospheric pressure, and is not adversely affected by temperature or pressure conditions. In a preferred embodiment, double vee-cone blending was employed for 1 hour to obtain a uniform mixture.

A uniform distribution of hexagonal boron nitride in the metal powder brings about excellent mechanical properties and lubricating performance.

After a uniform mixture is obtained, the mixture is either filled into a prefabricated casing or a cold-compacted "green" piece of a desired shape is made from the mixture. The powder mixture or green piece then is subjected to a hot-compaction process to achieve an actual density that is at least about 99% of the theoretical maximum density. Suitable methods of hot-compaction may include hot-isostatic pressing, extrusion, hot pressing, rapid omni-directional compaction ("ROC"), and a high pressure/high temperature ("HPHT") process. Hot-isostatic pressing is known in the art and is described in, for example, Price and Kohler, "Hot Isostatic Pressing of Metal Powders", *Metals Handbook*, Vol. 7, pp.419–43 ($9^{th}$ ed. 1984). Extrusion also is known in the art and is generally described in Mielnick, "*Metalworking Science and Engineering*", McGraw Hill, 1991. Rapid omni-directional compaction is described in U.S. Pat. Nos. 4,428,906 and 4,656,002. The HPHT process is described in U.S. Pat. Nos. 5,676,496 and 5,598,621. The teachings of the above cited reference and patents are incorporated herein by reference.

Although it is preferred that a hot-compaction process be used to obtain the desired density, any compaction process, including cold-compaction may be used. Further, compaction to an actual density to less than 99% of the theoretical density may be acceptable for some applications.

In a preferred embodiment, hot-isostatic pressing is employed. In this process, high-pressure gas is used to transfer heat and pressure through a flexible metallic membrane ("HIP can") to bring about densification and bonding of the metal and solid lubricant. The time, temperature, and pressure parameters for the process are selected based on the values required to achieve densification of the solid lubricant and the metal particles, and to bring about a chemical reaction (and therefore form a strong bond) between the two. Thus, it will be obvious to those skilled in the art, that the bonding parameters will be expected to vary according to the size, shape, specific compositions, and other properties of the materials that make up the shaped material as well as other factors such as fixturing, furnace design, and furnace load.

In hot isostatic pressing, it is necessary that the powder to be densified, or the article preshaped from the powder, have pores open to the surface, with a gas-tight casing to prevent the gas used as a pressure-transfer medium from penetrating into the article and interfering with densification. The powders either are filled into prefabricated casings or are pre-shaped to form green bodies having pores open to the surface and then placed in prefabricated casings or coated with a material which forms a vacuum-tight casing.

In the first instance, the powder mixture is placed in a hermetically sealable container made of a suitable metal. The starting powder may be either loaded and compacted by vibrating or tapping or cold isostatically pressed and machined to fit the container. The powder mixture also may be pre-pressed to facilitate loading into the containers and to help control final shrinkage. If desired, small amounts of a temporary binder such as polyvinyl alcohol may be used.

The container loaded with pre-pressed powder mixture is then heated and evacuated (subject to vacuum) to remove any temporary binder, residual water vapor and other gases in order to enhance final densification. The casing, together with its contents, are then evacuated and sealed gas-tight. If a temporary binder is utilized, it must be removed from the powder mixture preferably by heat and vacuum before sealing the casing.

The powder mixture also may be pre-shaped into green bodies having pores open to the surface and then sealed under vacuum in a gas-tight casing. The shaping can be carried out by conventional methods as, for example, by die pressing or cold isostatic pressing. The concomitant use of a temporary binder is generally not necessary. If desired, however, small amounts of a temporary binder may be used, such as polyvinyl alcohol or camphor.

After being shaped, the green bodies are provided with a gas-tight casing. The material used for the casings must be able to be sealed gas-tight, and must be plastically deformable at the densification temperatures required. Metals such as iron, chromium or nickel; metal alloys such as steel, and glasses or vitreous compositions which are plastically deformable within the densification temperature range can be used.

When using unshaped powder mixtures, prefabricated casings or capsules are required. Prefabricated casings can also be used with preshaped green bodies. In the case of preshaped green bodies, the gas-tight casing also can be produced by direct coating as, for example, by electroless wet deposition of a metal layer or by application of a vitreous composition which can subsequently be fused or sintered to form the gas-tight casing.

The powders or the green bodies in the vacuum-tight casings are subjected to an isostatic hot-pressing process in a high-pressure zone using an inert gas such as argon or nitrogen, as the pressure-transfer medium The encased materials are placed in a high-pressure autoclave and hot isostatically pressed at suitable temperature and pressure for a suitable time interval. In the process, it is advantageous to control pressure and temperature separately that is, to increase the gas pressure when the casing material begins to plastically deform under the pressure and temperature conditions. The pressure applied is preferably within the range of from about 5 to about 30 MPa and is reached by gradual increase in pressure after the densification temperature required in each case, which is preferably at least about 1400° F. The optimum temperature in each case is dependent on the fineness, purity and melting point of the powders used. In a preferred embodiment of the process the powder mixture in a steel container is hot isostatically pressed at 1392 to 1650° F. and 15 KSI (103 MPa) argon pressure for 3 hours.

After the pressure and temperature have been reduced, the cooled articles are removed from the high-pressure autoclave and freed from the casings as, for example, by machining away the container, twisting off metal casings, sandblasting glass casings or etching or other suitable process.

Depending on the pressure applied, and the temperature and the dwell time under these conditions, the shaped articles manufactured by the present process have a density of at least about 99% of its theoretical density. (In a powder mixture, there typically is a certain degree of porosity. The theoretical maximum density of a mixture refers to the density of a mixture with zero porosity.)

The metal-based materials made in accordance with embodiments of the invention may be used for bearings and bushings for aircraft fuel pumps, automobile lifter bushings, tie rod bushings for automobile pistons, and other articles currently made from leaded copper based alloys. Other uses include high performance bearings used in heavy construction and off-road equipment and machinery as well as other articles subject to high bearing loads.

Metal-based materials made in accordance with embodiments of the invention have shown reductions in coefficients of friction to 20% of that of leaded bronze, as well as higher bearing stress to lubrication failure as measured in a PV (pressure/velocity) cube on ring wear test.

EXAMPLES

The invention is described in more detail with reference to the following examples. The examples are solely for illustrative purposes and are not to be construed as limiting the scope of the invention.

Example 1

A mixture of 90 volume % 150A copper powder, provided by OMG Americas, Inc., Research Triangle Park N.C., was blended with 10 volume % BN powder (HCP powder obtained form Advanced Ceramics Corporation, Lakewood, Ohio) by mixing 297 grams of the copper with 3 grams of BN. Blending was conducted in a Patterson-Kelley double vee cone blender.

The blended powders were loaded into steel canisters, and vacuum de-gassed at a temperature of 1000° F. for 48 hours. Hot Isostatic Pressing was performed at a temperature of 1392° F., 15 KSI (103 MPa) for 3 hours.

This tensile properties of this material were; A 0.2% yield strength 14.9 KSI, an ultimate tensile strength of 29 KSI and an elongation of 13.2% elongation with an electrical conductivity of 91.1% IACS.

Example 2

Example 1 was repeated except using a mixture of 98 weight percent A150 copper and 2.0 weight percent tin, with an addition of 2 weight percent graphite, formed by mixing 294.4 grams of 150A copper powder with 6 grams of tin grade L-10 powder (obtained from OMG Americas) and 3 grams of graphite powder 325.

The tensile properties of this material were a 0.2% yield strength 23.4 KSI, an ultimate strength of 32.1 KSI, 7.9% elongation and an electrical conductivity of 33.4% IACS.

Example 3

Example 1 was repeated except using a mixture of 98.5 wt % A150 copper powder and 1.5 wt % L-10 grade tin powder to which 2 wt % of −325 graphite powder had been added. This was formed by mixing 295.5 grams of A-150 Cu with 4.5 grams of Sn, and adding 6.12 grams of graphite. This blend was and treated as in Example 1.

The tensile properties of this material were a 0.2% yield strength 20.1 KSI, an ultimate strength of 21.1 KSI, 0.5% elongation and an electrical conductivity of 31.2% IACS.

Example 4

Example 1 was repeated except using a mixture of 50% weight percent 150A copper, 50 weight percent RLX copper powder, to which 1% graphite and 1% boron nitride, grade AC6004 had been added.

The tensile properties of this material were a 0.2% yield strength 17.7 KSI, an ultimate strength of 24.1 KSI, 5% elongation and an electrical conductivity of 79.9% IACS.

Example 5

Example 1 was repeated except using a mixture of 90 volume percent copper and 10 volume percent boron nitride, formed by mixing 2,010 grams of 150A copper with 21 grams boron nitride AC6004 grade (obtained from Advanced Ceramics). The material was degassed at 1000° F., and held at that temperature for 48 hours. Hot Isostatic pressing was done in a with a hold of 3 hours time at a temperature of 1392° F. and an applied pressure of 15 KSI (15 MPa)

The hot isostatically pressed rod was machined into cube on ring specimens. The formed rod was found to have a coefficient of friction of 0.01, and a bearing stress-to-lubrication failure of 37,500 psi.

Although the invention has been described in combination with specific embodiments and examples, it is evident that many alternatives, modifications and variations will be apparent to those skilled in the art in light of the foregoing description. Accordingly, it is intended to embrace all modifications and variations as fall within the spirit and broad scope of the claims that follow.

What is claimed is:

1. A wear resistant, metal-based, roller-bearing comprising:
   i. a hot-isostatic pressed, uniform mixture of copper and a hexagonal boron nitride lubricant;
   ii. the pressed mixture having an actual density of at least 99 percent of the theoretical density of the mixture;
   iii. the metal being present in the amount from about 95 to about 99.9 weight percent of the mixture; and
   iv. the solid lubricant being present in an amount from abut 0.1 to about 5 weight percent of the mixture.

2. A wear-resistant, metal-based bushing or journal bearing comprising:
   i. a hot-isostatic pressed, uniform mixture of copper or copper alloy and a hexagonal boron nitride lubricant;
   ii. the pressed mixture having an actual density of at least 99 percent of the theoretical density of the mixture;

iii. the copper or copper alloy being present in the amount from about 95 to about 99.9 weight percent of the mixture; and iv. the solid lubricant being present in an amount from about 0.1 to about 5 weight percent of the mixture.

3. A wear-resistant, shaped, metal-based material, subject to high bearing loads, comprising a mixture of a metal selected from the group consisting of copper, copper alloys, stainless steel, tool steel, bearing steel and mixtures thereof, and from about 0.1 to abut 5.0 weigh percent of a solid lubricant; wherein the material has an actual density of at least about 99 percent of the theoretical density of the material.

4. A hot isostatically processed metal-based material comprising a metal selected from the group consisting of copper, copper alloys, stainless steel, tool steel, bearing steel and mixtures of any thereof, and from about 0.1 to about 5.0 weight percent hexagonal boron nitride, graphite or mixtures thereof, wherein the metal-based material has an actual density of at least 99 percent of the theoretical density of the metal-based material.

5. A wear resistant, metal-based product of the method comprising:
   i) forming a uniform mixture of a metal selected from the group consisting of copper, copper alloys, stainless steel, tool steel, bearing steel and mixtures of any thereof, and a solid lubricant selected from the group consisting of hexagonal boron nitride, graphite and mixtures thereof; and
   ii) extruding the mixture to form a compact having an actual density of at least 99 percent of the theoretical density of the mixture.

6. A wear-resistant, shaped, metal-based material, subject to high bearing loads, consisting essentially of a metal selected from the group consisting of copper, iron, aluminum, alloys thereof, mixtures of any thereof with another or an alloy of any thereof, and mixtures of alloys thereof;
   and from about 0.1 to about 5 weight percent of a solid lubricant;
   wherein the metal-based material has an actual density of at least about 99 percent of the theoretical density of the material.

7. A shaped, metal-based material of claim 6, wherein the solid lubricant is hexagonal boron nitride.

8. A hot isostatically processed metal-based material consisting essentially of a metal selected from the group consisting of copper, iron, aluminum, alloys thereof, mixtures of any thereof with another or an alloy of any thereof, and mixtures of alloys thereof; and
   from about 0.1 to about 5 weight percent hexagonal boron nitride, graphite, or a mixture thereof;
   wherein the metal-based material has an actual density of at least about 99 percent of the theoretical density of the metal-based material.

9. A wear-resistant, shaped, metal-based product of the method comprising:
   i) forming a uniform mixture consisting essentially of
      a) a metal selected from the group consisting of copper, iron, aluminum, alloys thereof, mixtures of any thereof with another or an alloy of any thereof, and mixtures of alloys thereof, and;
      b) and a solid lubricant selected from the group consisting of hexagonal boron nitride, graphite and mixtures thereof; and
   ii) extruding the mixture to form a compact having an actual density of at least 99 percent of the theoretical density of the mixture.

10. A shaped, metal-based material of claim 3, wherein the solid lubricant is present in an amount sufficient to reduce by at least about 20 percent the coefficient of friction of the material without the solid lubricant.

11. A shaped, metal-based material of claim 3, wherein the solid lubricant is present in the amount of from about 2 to about 5 weight percent.

12. An isostatically processed, metal-based material of claim 4, wherein the solid lubricant is present in an amount sufficient to reduce by at least about 20 percent the coefficient of friction of the material without the solid lubricant.

13. An isostatically processed, metal-based material of claim 4, wherein the solid lubricant is present in the amount of from about 2 to about 5 weight percent.

14. A shaped, metal-based material of claim 6, wherein the solid lubricant is present in an amount sufficient to reduce by at least about 20 percent the coefficient of friction of the material without the solid lubricant.

15. A shaped, metal-based material of claim 6, wherein the solid lubricant is present in the amount of from about 2 to about 5 weight percent.

16. A hot isostatically processed, metal-based material of claim 8, wherein the solid lubricant is present in an amount sufficient to reduce by at least about 20 percent the coefficient of friction of the material without the solid lubricant.

17. A hot isostatically processed, metal-based material of claim 8, wherein the solid lubricant is present in the amount of from about 2 to about 5 weight percent.

18. A shaped, metal-based material of claim 3 wherein the metal is copper or copper alloy.

19. A shaped, metal-based material of claim 3, wherein the metal is stainless steel, tool steel or bearing steel.

20. A shaped, metal-based material of claim 3 wherein the solid lubricant is hexagonal boron nitride.

21. A shaped, metal-based material of claim 18 wherein the solid lubricant is hexagonal boron nitride.

22. An isostatically processed metal-based material of claim 4 wherein the metal-based material comprises copper or copper alloy and hexagonal boron nitride.

* * * * *